(12) United States Patent
Hu et al.

(10) Patent No.: US 11,585,550 B2
(45) Date of Patent: Feb. 21, 2023

(54) CONTROL METHOD AND CONTROL DEVICE FOR AIR CONDITIONER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Guohui Hu, Zhuhai (CN); Haibin Liu, Zhuhai (CN); Pei Qian, Zhuhai (CN); Yao Zhao, Zhuhai (CN); Luping Zhong, Zhuhai (CN); Xiantao Zhu, Zhuhai (CN); Zifeng Liang, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 34 days.

(21) Appl. No.: 16/624,306

(22) PCT Filed: Dec. 28, 2017

(86) PCT No.: PCT/CN2017/119447
§ 371 (c)(1),
(2) Date: Dec. 19, 2019

(87) PCT Pub. No.: WO2018/233266
PCT Pub. Date: Dec. 27, 2018

(65) Prior Publication Data
US 2020/0166231 A1 May 28, 2020

(30) Foreign Application Priority Data
Jun. 21, 2017 (CN) .......................... 201710476436.1

(51) Int. Cl.
*F24F 11/32* (2018.01)
*F24F 11/52* (2018.01)
(Continued)

(52) U.S. Cl.
CPC .............. *F24F 11/32* (2018.01); *F24F 11/52* (2018.01); *F24F 11/58* (2018.01); *G05B 15/02* (2013.01)

(58) Field of Classification Search
CPC .. F24F 11/30; F24F 11/56; F24F 11/58; F24F 11/52; F24F 11/32; F24F 11/65;
(Continued)

(56) References Cited

U.S. PATENT DOCUMENTS 8,612,639 B1 * 12/2013 Righi ....................... F24F 11/24
710/15
2005/0270151 A1 * 12/2005 Winick ............... H04L 12/2818
340/539.1
(Continued)

FOREIGN PATENT DOCUMENTS

CN 201377875 Y 1/2010
CN 103231197 A 8/2013
(Continued)

OTHER PUBLICATIONS

Xuetao Han et al.,"Air conditioner repair from beginner to master", China Railway Publishing House, Nov. 2009, p. 365.
(Continued)

*Primary Examiner* — Darrin D Dunn
(74) *Attorney, Agent, or Firm* — Kilpatrick Townsend & Stockton, LLP

(57) ABSTRACT

A control method and a control device for an air conditioner, the control method including: determining a current control mode of the air conditioner (S202), the control mode including at least a screen-independent mode configured to repre-
(Continued)

sent a mode, in which the air conditioner is independent of a display screen but can operates normally; when the control mode is the screen-independent mode, controlling the air conditioner to operate according to a current operating state (S204).

7 Claims, 3 Drawing Sheets

(51) Int. Cl.
*G05B 15/02* (2006.01)
*F24F 11/58* (2018.01)

(58) Field of Classification Search
CPC ............ F24F 11/49; G05B 2219/2614; G05B 2219/2642; G05B 15/02; G06F 3/1454; G06F 3/1423; G06F 2203/0383; G06F 11/3055; G06F 11/2005; H04W 4/33; G09G 2330/08; G09G 2380/12; G09G 2300/023; H04N 7/181; H04N 5/213; H04N 13/395; H04N 21/4122; H04N 21/4126; H04N 21/422; H04N 21/4307; H04N 21/4347; H04N 21/43615; H04N 21/43637; H04N 5/23222; H04N 5/2353; H04N 5/2354; H04N 5/2628; H04N 5/63; H04N 7/18; H04N 7/188; H04N 9/12
See application file for complete search history.

(56) References Cited

U.S. PATENT DOCUMENTS

| | | | |
|---|---|---|---|
| 2007/0114295 A1* | 5/2007 | Jenkins | F24F 11/30 236/51 |
| 2008/0120446 A1* | 5/2008 | Butler | G05D 23/1902 710/63 |
| 2009/0140057 A1* | 6/2009 | Leen | F24F 11/30 236/49.3 |
| 2009/0217084 A1* | 8/2009 | Ebbert | G06F 3/1454 714/5.1 |
| 2013/0123991 A1* | 5/2013 | Richmond | G05D 23/1902 700/276 |
| 2013/0245838 A1* | 9/2013 | Zywicki | G05D 23/1905 700/278 |
| 2014/0028907 A1* | 1/2014 | Nuyttens | H04N 7/181 348/383 |
| 2014/0203091 A1* | 7/2014 | Nair | G05D 23/1905 236/51 |
| 2014/0244047 A1* | 8/2014 | Oh | G08B 19/00 700/278 |
| 2016/0036626 A1* | 2/2016 | Bale | H04L 41/0677 370/242 |
| 2017/0364424 A1* | 12/2017 | Swanson | G06F 11/2048 |
| 2018/0259782 A1* | 9/2018 | Newton | G09G 3/003 |
| 2018/0295261 A1* | 10/2018 | Beckert | H04N 7/181 |
| 2020/0104091 A1* | 4/2020 | Fairchild | G09G 5/12 |

FOREIGN PATENT DOCUMENTS

| | | |
|---|---|---|
| CN | 104359196 A | 2/2015 |
| CN | 104613730 A | 5/2015 |
| CN | 105486524 A | 4/2016 |
| CN | 105650827 A | 6/2016 |
| CN | 105864964 A | 8/2016 |
| CN | 105913643 A | 8/2016 |
| CN | 106524392 A | 3/2017 |
| CN | 107355944 A | 11/2017 |
| JP | 2006177571 A | 7/2006 |
| JP | 2012122645 A | 6/2012 |
| JP | 2012149852 A | 8/2012 |
| JP | 2015010769 A | 1/2015 |
| JP | 2016121830 A | 7/2016 |
| KR | 20130022295 A | 3/2013 |
| WO | 2015071958 A1 | 5/2015 |

OTHER PUBLICATIONS

Lili Tong,"Shen Wei Yi, Xin Yi Dong", Central Radio and Television University Press, Beijing, ISBN 978-7-304-06178-4, total 4 pages, Jun. 2013.

\* cited by examiner

CONTROL METHOD AND CONTROL DEVICE FOR AIR CONDITIONER

TECHNICAL FIELD

The present disclosure relates to the field of air conditioner control, and particularly to a control method and a control device for an air conditioner.

BACKGROUND

In the prior art, the air-conditioning control system usually uses various display screens (for example, a touch screen) as the human-computer interaction interface of the unit, and the user uses the display interface of the display screen as a window to view and control the operating state of the unit. FIG. 1 is a schematic diagram illustrating a control for an air conditioner in the prior art. Taking a central air conditioner installed in a large office building as an example, the host of each air conditioner is equipped with a corresponding touch screen on which the current indoor temperature, the current target indoor temperature and the current operating state of the air conditioner are displayed. When the user intends to control the air conditioner, the user can set the target temperature through increasing or decreasing the temperature according to a preset button on the touch screen, and can change the operating mode of the air conditioner through the preset button on the touch screen. For example, the operating mode of the air conditioner is changed from a cooling mode to a ventilation mode.

However, the above control method for the air conditioner has the following disadvantages: when the display of the unit malfunctions, or when the unit is independent of the display, the air conditioner cannot operate normally, and the control mode of the air conditioner is single.

As for the problem in the prior art that the air conditioner is unusable in the case of a malfunction of the display screen of the air conditioner, no effective solutions have been provided till now.

SUMMARY

The embodiments of the present disclosure provide a control method and a control device for an air conditioner, to solve at least the technical problem in the prior art that the air conditioner cannot operate in the case the display screen of the air conditioner malfunctions.

According to one aspect of an embodiment of the present disclosure, a control method for an air conditioner is provided, and the control method includes: determining a current control mode of the air conditioner, wherein the control mode comprises at least a screen-independent mode configured to represent a mode in which the air conditioner is independent of a display screen of the air conditioner and operates normally; controlling the air conditioner to operate according to a current operating state when the control mode is in the screen-independent mode.

In an embodiment, detect whether the air conditioner comprises a display screen allowing the air conditioner to operate normally; control the air conditioner to enter the screen-independent mode if the air conditioner does not comprise the display screen allowing the air conditioner to operate normally.

In an embodiment, detect whether the air conditioner comprises the display screen; detecting whether the display screen of the air conditioner malfunctions if the air conditioner comprises the display screen; determine that the air conditioner does not comprise the display screen allowing the air conditioner to operate normally, if the air conditioner does not comprise the display screen, or if the display screen of the air conditioner malfunctions.

In an embodiment, detect whether the air conditioner is connected to an external device, wherein the external device is configured to control the air conditioner; control the air conditioner to enter a terminal control mode if the air conditioner is connected to the external device, wherein the terminal control mode is configured to control the air conditioner through the external device communicating with the air conditioner; control the air conditioner to maintain the current operating state if the air conditioner is not connected to the external device.

In an embodiment, block a feedback of a display screen malfunction to make the air conditioner operate according to the current operating state.

According to an embodiment of the present disclosure, a control device for an air conditioner is provided, comprising: a determination module, configured to determine a current control mode of the air conditioner, wherein the control mode comprises at least a screen-independent mode configured to represent a mode, in which the air conditioner is independent of a display screen of the air conditioner and operates normally; a control module, configured to control the air conditioner to operate according to a current operating state when the control mode is the screen-independent mode.

In an embodiment, a detection sub-module is configured to detect whether the air conditioner comprises a display screen allowing the air conditioner to operate normally; a control sub-module is configured to control the air conditioner to enter the screen-independent mode if the air conditioner does not comprise the display screen allowing the air conditioner to operate normally.

In an embodiment, a first detection unit is configured to detect whether the air conditioner comprises the display screen; a second detection unit is configured to detect whether the display screen of the air conditioner malfunctions if the air conditioner comprises the display screen; a determination unit is configured to determine that the air conditioner does not comprise a display screen allowing the air conditioner to operate normally, in a case the air conditioner does not comprise the display screen, or in a case the display screen of the air conditioner malfunctions.

In at least part of the embodiments of the present disclosure, a current control mode of the air conditioner is determined, and the air conditioner is controlled to operate according to the current operating state when the control mode is in the screen-independent mode. Through the screen-independent mode provided by the above technical solution, the air conditioner can still operate normally without the display screen or in the case the display screen is damaged, so as to solve the technical problem in the prior art that the air conditioner cannot operate when the display screen of the air conditioner malfunctions, and achieve the technical effect that the air conditioner independent of the display screen can operate autonomously, thereby achieving diversified controls for the air conditioner.

BRIEF DESCRIPTION OF DRAWINGS

The accompanying drawings described herein are intended to provide a further understanding of the present disclosure, and they are a part of the disclosure. The exemplary embodiments and the description thereof in the present disclosure are used to interpret the present disclosure and do not constitute an improper limitation to the present disclosure. In the accompanying drawings.

DETAILED DESCRIPTION OF DISCLOSED EMBODIMENTS

In order to make the those skilled in the art better understand the solutions of the present disclosure, the technical solutions in the embodiments of the present disclosure will be described clearly and completely herein with reference to the accompanying drawings of the embodiments of the present disclosure. Obviously, the embodiments described herein are only part of the embodiments of the present disclosure, rather than all the embodiments. Based on the embodiments in the present disclosure, all other embodiments obtained by those skilled in the art without any creative work shall fall within the scope of the present disclosure.

It should be noted that the terms "first", "second" and the like in the specification and claims of the present disclosure are used to distinguish the similar objects, and are not necessarily used to describe a specific order or precedence order. It should be appreciated that the data used in such a way can be interchanged where appropriate, so that the embodiments of the disclosure described herein can be implemented in a sequence other than those orders illustrated or described herein. In addition, the terms "comprise" and "include" and any deformation thereof are intended to cover a non-exclusive inclusion, for example, a process, a method, a system, a product, or a device that includes a series of steps or units is not necessarily limited to clearly list those steps or units, but can include other steps or units not explicitly listed, or can include other steps or units inherent to such a process, a method, a product or a device.

First Embodiment

According to an embodiment of the present disclosure, a control method for an air conditioner is provided. It should be noted that the steps illustrated in the flowchart can be executed in a computer system of such as a set of computer executable instructions. Also, although a logic sequence is shown in the flowchart, in some cases the steps shown or described herein can be performed in a different order other than the sequence described herein.

Figure 1:
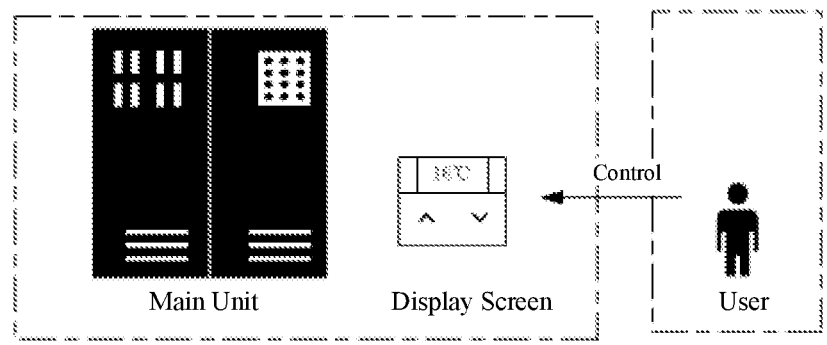
FIG. 1 is a schematic diagram illustrating a control for an air conditioner in the prior art.
Figure 2:
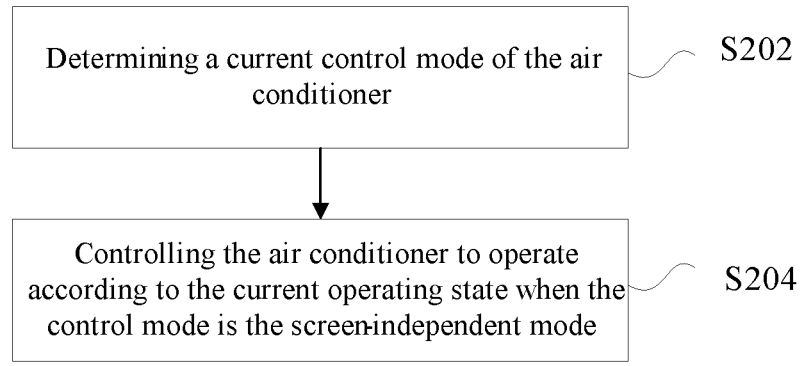
FIG. 2 is a flow chart of a control method for an air conditioner according to an embodiment of the present disclosure.

FIG. 2 is a flow chart of a control method for an air conditioner according to an embodiment of the present disclosure. As shown in FIG. 2, the method includes the following steps.

Step S202, determine a current control mode of the air conditioner; the control mode includes at least a screen-independent mode configured to represent a mode in which the air conditioner is independent of a display screen of the air conditioner but can operate normally.

Specifically, the above control mode is configured to represent the control manner of the air conditioner, that is, the air conditioner can be controlled through which manner. The display screen of the above air conditioner can be a touch screen, and includes a display screen disposed on the air conditioner panel or a display screen disposed at a predetermined indoor position separately from the air conditioner. The control mode of the air conditioner can include: a screen-independent mode, a terminal control mode, or a display screen control mode.

It should be noted that all of the air conditioners in the prior art include a display screen. When the display screen of the air conditioner malfunctions, the air conditioner cannot operate, that is, the air conditioner in the prior art cannot operate in the screen-independent mode, and the air conditioner can operate only when the display screen is normal. While in the above embodiment, the control mode of the air conditioner includes a screen-independent mode, that is, a mode in which the air conditioner can operate normally independent of a display screen of the air conditioner. That the air conditioner is independent of the display screen can include two cases: one case is that the display screen of the air conditioner malfunctions and cannot operate normally, and another case is that the air conditioner does not include a display screen.

Step S204, when the control mode is the screen-independent mode, control the air conditioner to operate according to the current operating state.

Specifically, the current operating state of the air conditioner is a recent operating state immediately before the control mode of the air conditioner is switched to the screen-independent mode. The current operating state of the air conditioner can include: a current operating mode, a current target temperature, and the like.

In an optional embodiment, taking the air conditioner whose display screen malfunctions as an example, when the display screen of the air conditioner malfunctions, if the control mode of the air conditioner is determined to be the screen-independent mode, and if the control mode of the air conditioner operates in a cooling mode before being switched into the screen-independent mode, and the target temperature is 25° C., then the air conditioner remains in the cooling mode and continues operating according to the target temperature of 25° C.

From the foregoing description, in the above embodiment of the present disclosure, the current control mode of the air conditioner is determined, and when the control mode is the screen-independent mode, the air conditioner is controlled to operate according to the current operating state. Through the screen-independent mode provided by the above technical solution, the air conditioner can still operate normally without a display screen or in the case the display screen of the air conditioner is damaged, thereby solving the technical problem in the prior art that the air conditioner cannot operate when the display screen of the air conditioner malfunctions, and achieving the technical effect that the air conditioner independent of the display screen can operate autonomously, and further achieving diversified controls for the air conditioner.

In an embodiment, according to the above embodiment of the present disclosure, the step of determining the current control mode of the air conditioner includes following steps.

Step S2021, detect whether the air conditioner includes a display screen allowing the air conditioner to operate normally.

Specifically, in the above step, the display screen allowing the air conditioner to operate normally is configured to characterize that the air conditioner includes a display screen, and that the display screen of the air conditioner operates normally without a malfunction.

Step S2023, if the air conditioner does not include a display screen allowing the air conditioner to operate normally, control the air conditioner to enter the screen-independent mode.

Specifically, after the air conditioner is controlled to enter the screen-independent mode, an alarm message can also be sent to warn the user that the control mode of the air conditioner has been adjusted. In an optional embodiment, when the display screen of the air conditioner malfunctions, at this moment the air conditioner does not include a display screen capable of operating normally, thus the air conditioner is controlled to enter the screen-independent mode to operate in the current operating state.

It should be noted that in the prior art, when the display screen of the air conditioner malfunctions, the air conditioner can no longer continue to operate. But in the above solutions of the present disclosure, when the air conditioner does not include a display screen allowing the air conditioner to operate normally, through changing the control mode of the air conditioner, the air conditioner can continue operating in the case the display screen malfunctions.

In an embodiment, according to the above embodiment of the present disclosure, the step of detecting whether the air conditioner includes a display screen allowing the air conditioner to operate normally includes: detecting whether the air conditioner includes a display screen; detecting whether the display screen of the air conditioner malfunctions if the air conditioner includes a display screen; if the air conditioner does not include a display screen, or if the display screen of the air conditioner malfunctions, it is determined that the air conditioner does not include a display screen allowing the air conditioner to operate normally.

In an embodiment, according to the above embodiment of the disclosure, after the step of controlling the air conditioner to operate according to the current operating state, the above method further includes the following steps.

Step S206, detect whether the air conditioner is connected to an external device; the external device is configured to control the air conditioner.

Specifically, the above external device can be a smart terminal such as a smart mobile phone or a tablet computer. In the case the air conditioner has an open interface provided by a communication module (for example, a Bluetooth communication module, a WIFI communication module, etc.), the air conditioner can communicate with the external device through the open interface, to implement the terminal control mode.

Step S208: if the air conditioner is connected to an external device, control the air conditioner to enter the terminal control mode; the terminal control mode is configured to control the air conditioner through the external device communicating with the air conditioner.

Step S2010: if the air conditioner is not connected to an external device, control the air conditioner to maintain the current operating state.

In an optional embodiment, when the air conditioner is switched into the screen-independent mode due to the display screen malfunction, the air conditioner maintains operating in the current operating state. When the user intends to control the air conditioner and change the operating mode of the air conditioner, a smart mobile phone, as an external device of the air conditioner, establishes a communication with the air conditioner to control the air conditioner. After the smart mobile phone completes controlling the air conditioner, the communication between the smart mobile phone and the air conditioner is disconnected, and the air conditioner is restored to the screen-independent mode and operates according to the current operating state.

Figure 3:
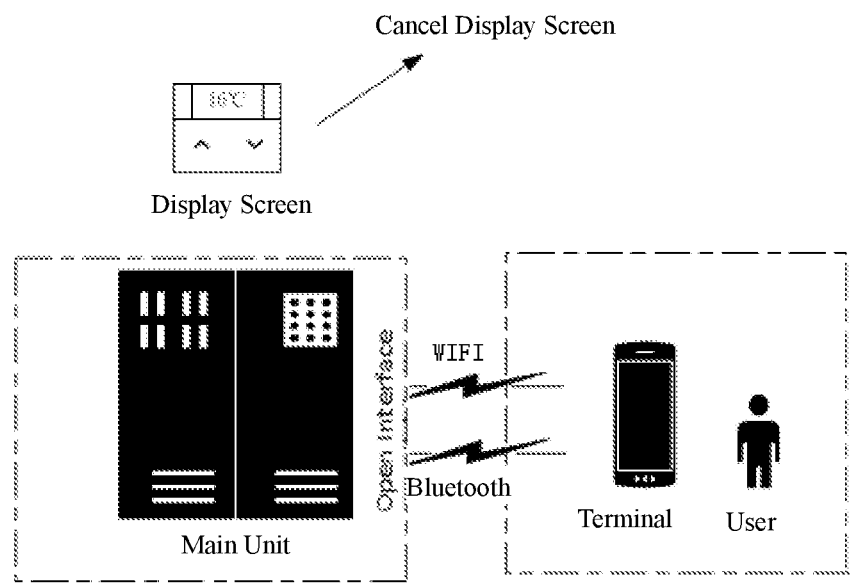
FIG. 3 is a schematic diagram illustrating a control for an air conditioner according to an embodiment of the present disclosure.

FIG. 3 is a schematic diagram illustrating a control for an air conditioner according to an embodiment of the present disclosure. In another optional embodiment, the main unit of the air conditioner does not include a display screen, and the main unit of the air conditioner includes an open interface (e.g., a WIFI interface and a Bluetooth interface, etc.). When the user intends to control the air conditioner, the smart mobile phone, as the external device of the air conditioner, communicates with the air conditioner through the open interface of the air conditioner and controls the air conditioner. After the smart mobile phone completes controlling the air conditioner, the communication between the smart phone and the air conditioner is disconnected, and the air conditioner is restored to the screen-independent mode and operates in the current operating state.

It should be noted that the display screen will increase unnecessary power loss of the system when the unit operates normally. Therefore, when the cost of the unit is limited, or if it's unnecessary to detect the operating parameters of the air conditioner in real time, the display screen can be directly excluded, and the unit operates according to the screen-independent operating state. If the user has a requirement for controlling the air conditioner, the air conditioner can be controlled via the external device connected through the open interface of the unit, thereby achieving the effect of reducing the power consumption of the air conditioner.

In an embodiment, according to the above embodiment of the present disclosure, in the case the display screen of the air conditioner malfunctions, the step of controlling the air conditioner to operate according to the current operating state includes: blocking a feedback of the display screen malfunction, to enable the air conditioner to operate according to the current operating state.

As for the air conditioner in the prior art, when the air conditioner malfunctions, the display screen malfunction is fed back, and the air conditioner cannot continue operating when the malfunction is fed back. However, in the above solution of the present disclosure, the feedback of the display screen malfunction is blocked, such that the air conditioner can continue operating according to the current operating state in the case of the malfunction of the display screen.

Figure 4:
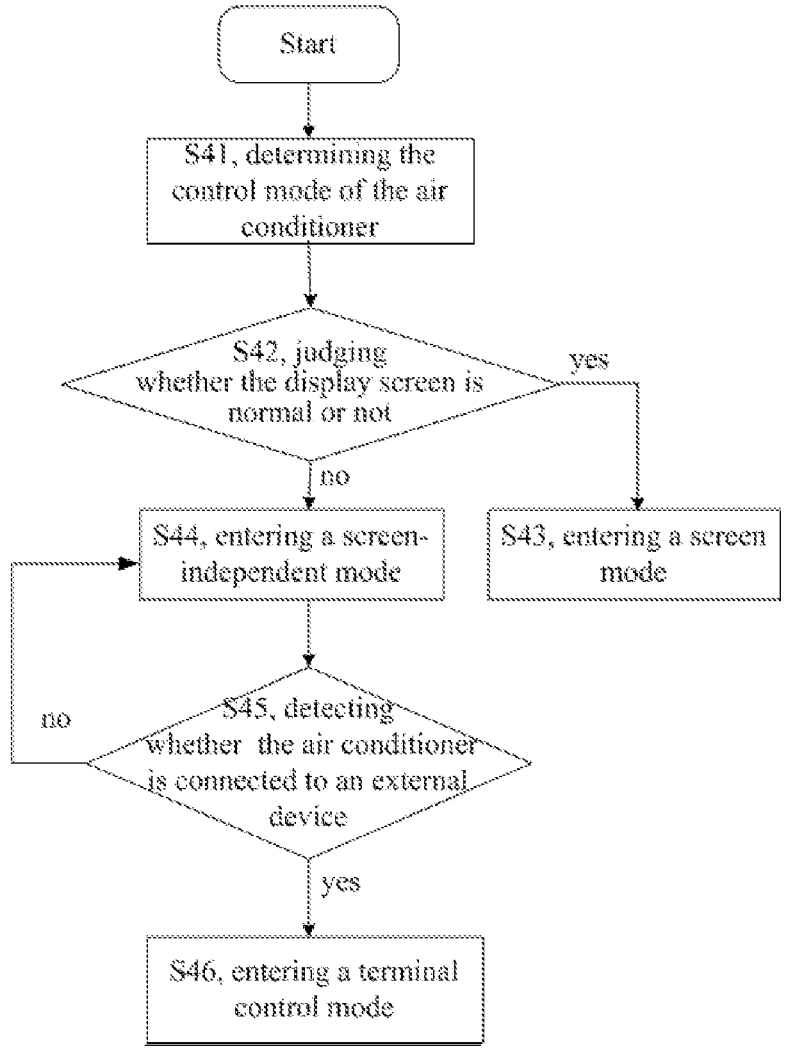
FIG. 4 is a flow chart of a control method for an air conditioner according to an optional embodiment of the present disclosure.

FIG. 4 is a flow chart of a control method for an air conditioner according to an optional embodiment of the present disclosure. The control method for the air conditioner will be described below with reference to FIG. 4.

S41, determine a control mode of the air conditioner. Specifically, the control mode can include: a screen-independent mode, a terminal control mode, or a display screen control mode.

S42, judge whether the display screen is normal or not. If the display screen of the air conditioner is normal, proceed with a step S43, and if the display screen of the air conditioner is not normal, proceed with a step S44.

S43, enter a screen mode.

In the above step, when the display screen of the air conditioner is normal, the air conditioner enters a screen mode, that is, the display screen control mode.

S44, enter a screen-independent mode.

In the above step, in the case the display screen of the air conditioner is not normal, the air conditioner enters the screen-independent mode, and after the air conditioner enters the screen-independent mode, detect whether there is an external device connected to the air conditioner.

S45, detect whether the air conditioner is connected to an external device. When the air conditioner is connected to an external device, proceed with a step S46, and if the air conditioner is not connected to an external device, proceed with the step S44.

S46, enter a terminal control mode.

The control method for the air conditioner provided by the present disclosure can achieve the screen-independent mode of the air conditioner, such that the air conditioner control system can operate normally according to the preset operating logic in the case the display screen of the air conditioner is damaged or dormant. Moreover the main unit of the air conditioner control system provides a variety of wireless interfaces open to the outside, so that the external device can, according to actual application requirements of the user, communicate with the control system wirelessly through multiple communication modes such as a Bluetooth, WIFI and so on, to control the air conditioner based on a control mode and collect data of the air conditioner, thereby achieving diversified human-computer interactions.

Therefore, the screen-independent mode provided by the method can not only solve the problem of the influence of the abnormal operating state of the display screen on the operating state of the whole machine, but also reduce the power consumption of the whole machine, thereby improving the energy efficiency level of the air-conditioning unit. In addition, the open interfaces of the air conditioner change a single control architecture of the display screen acting as the unique control platform, such that the control interfaces of the air conditioner are diversified and have strong compatibility.

Second Embodiment

Figure 5:
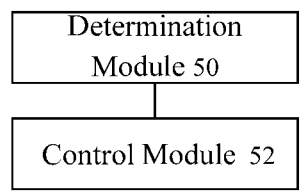
FIG. 5 is a schematic diagram illustrating a control device for an air conditioner according to an embodiment of the present disclosure.

According to an embodiment of the present disclosure, a control device for an air conditioner is provided. FIG. 5 is a schematic diagram illustrating a control device for an air conditioner according to an embodiment of the present disclosure. As shown in FIG. 5, the control device includes the following modules.

A determination module 50 is configured to determine a current control mode of the air conditioner; the control mode includes at least a screen-independent mode configured to represent a mode, in which the air conditioner is independent of the display screen of the air conditioner but can operate normally.

Specifically, the control mode is configured to represent the control manner for controlling the air conditioner, that is, the air conditioner can be controlled through a certain control manner. The display screen of the air conditioner can be a touch screen, including a display screen disposed on the air conditioner panel or a display screen disposed at a predetermined indoor position separately from the air conditioner. The control mode of the air conditioner can include: a screen-independent mode, a terminal control mode, or a display screen control mode.

It should be noted that all of the air conditioners in the prior art include a display screen. When the display screen of the air conditioner malfunctions, the air conditioner cannot operate, that is, the air conditioner in the prior art does not have the screen-independent mode, and the air conditioner operates only when the display screen is normal. In the above embodiment, the control mode of the air conditioner includes a screen-independent mode, that is, a mode in which the air conditioner is independent of the display screen of the air conditioner and can operate normally. That the air conditioner is independent of the display screen can include two cases: one case is that the display screen of the air conditioner malfunctions and cannot operate normally, and the other case is that the air conditioner does not include a display screen.

A control module 52 is configured to control the air conditioner to operate according to the current operating state when the control mode is the screen-independent mode.

Specifically, the current operating state of the air conditioner is a recent operating state immediately before switching the control mode of the air conditioner to the screen-independent mode, and the current operating state of the air conditioner can include: a current operating mode, a current target temperature and the like.

From the foregoing description, in the embodiment of the present disclosure, the current control mode of the air conditioner is determined by the determination module, and the air conditioner is controlled, by the control module, to operate according to the current operating state in the case the control mode is the screen-independent mode. Through the screen-independent mode provided by the above technical solution, the air conditioner can still operate normally without a display screen or in the case the display screen of the air conditioner is damaged, thereby solving the technical problem in the prior art that the air conditioner cannot operate when the display screen of the air conditioner malfunctions, and achieving the technical effect that the air conditioner independent of the display screen operates autonomously, and further achieving diversified controls for the air conditioner.

In an embodiment, according to the above embodiment of the present disclosure, the determination module includes:

a detection sub-module, which is configured to detect whether the air conditioner includes a display screen allowing the air conditioner to operate normally;

a control sub-module, which is configured to control the air conditioner to enter the screen-independent mode if the air conditioner does not include a display screen allowing the air conditioner to operate normally.

In an embodiment, according to the embodiment of the present disclosure, the detection sub-module includes:

a first detection unit, which is configured to detect whether the air conditioner includes a display screen;

a second detection unit, which is configured to detect whether the display screen of the air conditioner malfunctions if the air conditioner includes a display screen;

a determination unit, which is configured to determine that the air conditioner does not include the display screen allowing the air conditioner to operate normally, in the case the air conditioner does not include a display screen or that the display screen of the air conditioner malfunctions.

In an embodiment, according to the embodiment of the present disclosure, the control device further includes:

a detection module, which is configured to detect whether the air conditioner is connected to an external device after the air conditioner is controlled to operate according to the current operating state; where the external device is configured to control the air conditioner;

a first control mode switching module, which is configured to control the air conditioner to enter the terminal control mode if the air conditioner is connected to an external device; where the terminal control mode is configured to control the air conditioner through the external device communicating with the air conditioner;

a second control mode switching module, which is configured to control the air conditioner to maintain the current operating state if the air conditioner is not connected to an external device.

In an embodiment, according to the embodiment of the present disclosure, the control module is further configured to block a feedback of the display screen malfunction, to make the air conditioner operate according to the current operating state.

Third Embodiment

According to an embodiment of the present disclosure, a storage medium is provided. The storage medium includes computer programs stored thereon; the computer programs, when executed, control a device in which the storage medium is located to perform the control method of any one of the air conditioners in the first embodiment. The above storage medium can include, but is not limited to, various media capable of storing program codes, such as a U disk, a read-only memory (ROM), a random access memory (RAM), a removable hard disk, a magnetic disk, or an optical disk, and the like.

Fourth Example

According to an embodiment of the present disclosure, a processor is provided. The processor is configured to execute a program. The program, when executed, causes the processor to perform the control method of any one of the air conditioners of the first embodiment. The above processor can include, but is not limited to, a processing unit such as a microprogram control unit (MCU) or a field programmable gate array (FPGA), etc.

The serial numbers of the embodiments of the present disclosure are merely used for illustration, and do not represent the advantages and disadvantages of the embodiments.

In the above embodiments of the present disclosure, the description of each embodiment lays particular emphasis respectively. As for part of an embodiment which is not detailed, refer to the related descriptions of other embodiments.

In the several embodiments provided by the present disclosure, it should be appreciated that the disclosed technical contents can be implemented in other manners. The device embodiments described above are only illustrative. For example, the division of the unit can be a logical function division. In actual implementation, there can be another division manner, for example, multiple units or components can be combined or integrated into another system, or some features can be ignored or not executed. In addition, the mutual coupling or direct coupling or communication connection shown or discussed can be an indirect coupling or an indirect communication connection through some interfaces, units or modules, and can be electrical or otherwise.

The units described as separate parts can or cannot be physically separated, and the parts displayed as units can or cannot be physical units, that is, can be located at one place, or can be distributed to multiple units. Some or all of the units can be selected according to the actual requirements to achieve the purpose of the solution of the embodiment.

In addition, each function unit in each embodiment of the present disclosure can be integrated into one processing unit, or each unit can exist physically separately, or, two or more than two units can be integrated into one unit. The above integrated unit can be implemented in the form of hardware or in the form of a software function unit.

The integrated unit, if implemented in the form of a software function unit and sold or used as a standalone product, can be stored in a computer readable storage medium. Based on such understanding, the technical solution of the present disclosure can be technically embodied in the form of a software product, or part that contributes to the prior art can be embodied in the form of software product, or all or part of the technical solution can be embodied in the form of a software product. The computer software product is stored in a storage medium which includes a number of instructions for causing one computer device (which can be a personal computer, server or network device, etc.) to perform all or part of the steps of the methods described in various embodiments of the present disclosure. The foregoing storage medium includes various media capable of storing program codes, such as a U disk, a Read-Only Memory (ROM), a Random Access Memory (RAM), a removable hard disk, a magnetic disk, or an optical disk, and the like.

The above descriptions are only preferred embodiments of the present disclosure, and it should be noted that various improvements and modifications can be made by those skilled in the art without departing from the principles of the present disclosure, and these improvements and modifications also should be considered as the protection scope of the present disclosure.

INDUSTRIAL APPLICABILITY

As described above, the control method and the control device for the air conditioner provided by at least some embodiments of the present disclosure have the following beneficial effects: through providing the screen-independent mode, the air conditioner can still operate normally without a display screen or in the case the display screen is damaged, thereby solving the technical problem in the prior art that the air conditioner cannot operate when the display screen of the air conditioner malfunctions, and achieving the technical effect that the air conditioner independent of the display screen can operate autonomously, and further achieving the diversified controls for the air conditioner.

The invention claimed is:

1. A control method for an air conditioner, comprising:
   determining a current control mode of the air conditioner using a determination module, wherein the control mode comprises at least a screen-independent mode, a terminal control mode, and a display mode
   wherein the screen-independent mode is coupled with a display screen of the air conditioner and configured to implement previously stored control parameters responsive to a display screen malfunction;
   wherein the display mode is selected responsive to determining the display screen is normal;
   wherein the terminal control mode is selected after the air conditioner is controlled to operate according to a current operating state for accepting external inputs; and
   controlling the air conditioner to operate according to the previously stored control parameters when the control mode is the screen-independent mode, wherein the current operating state comprises a current operating mode and a current target temperature;
   wherein the determining the current control mode of the air conditioner comprises:

detecting, using a detection sub-module, whether the air conditioner comprises a display screen allowing the air conditioner to operate normally;
controlling, using a control sub-module, the air conditioner to enter the screen-independent mode when the air conditioner does not comprise the display screen allowing the air conditioner to operate normally;
wherein the detecting whether the air conditioner comprises the display screen allowing the air conditioner to operate normally comprises:
detecting whether the air conditioner comprises the display screen;
detecting whether the display screen of the air conditioner malfunctions when the air conditioner comprises the display screen;
determining that the air conditioner does not comprise the display screen allowing the air conditioner to operate normally, when the air conditioner does not comprise the display screen, or when the display screen of the air conditioner malfunctions;
wherein after the controlling the air conditioner to operate according to the current operating state, the control method further comprising:
detecting whether the air conditioner is connected to an external device, wherein the external device is configured to control the air conditioner; and
controlling the air conditioner to enter the terminal control mode when the air conditioner is connected to the external device, wherein the terminal control mode is configured to control the air conditioner through the external device communicating with the air conditioner;
controlling the air conditioner to maintain the current operating state when the air conditioner is not connected to the external device.

2. The control method according to claim 1, wherein the determining the current control mode of the air conditioner comprises controlling the air conditioner to enter the display screen control mode when the air conditioner comprises the display screen allowing the air conditioner to operate normally.

3. The control method according to claim 1, wherein, the air conditioner has an open interface provided by a communication module; the communication module comprises a Bluetooth communication module and a WIFI communication module; the air conditioner communicates with the external device through the open interface.

4. A non-transitory storage medium, comprising computer programs stored thereon; wherein the computer programs, when executed, control a device in which the storage medium is located to perform the control method for the air conditioner of claim 1.

5. A processor for executing a program, wherein the program, when executed, causes the processor to perform the control method for the air conditioner of claim 1.

6. A control device for an air conditioner, comprising:
a processor and a memory for storing program instructions executed by the processor;
wherein the processor is configured to:
determine a current control mode of the air conditioner using a determination module, wherein the control mode comprises at least a screen-independent mode, a terminal control mode, and a display mode;
wherein the screen-independent mode is coupled with a display screen of the air conditioner and configured to implement previously stored control parameters responsive to a display screen malfunction;
wherein the display mode is selected responsive to determining the display screen is normal;
wherein the terminal control mode is selected after the air conditioner is controlled to operate according to a current operating state for accepting external inputs; and
control the air conditioner to operate according to the previously stored control parameters when the control mode is the screen-independent mode, wherein the current operating state comprises a current operating mode and a current target temperature;
wherein the processor is further configured to be capable of executing the stored program instructions to:
detect, using a detection sub-module, whether the air conditioner comprises a display screen allowing the air conditioner to operate normally;
control, using a control sub-module, the air conditioner to enter the screen-independent mode when the air conditioner does not comprise the display screen allowing the air conditioner to operate normally;
wherein the processor is further configured to be capable of executing the stored program instructions to:
detect whether the air conditioner comprises the display screen;
detect whether the display screen of the air conditioner malfunctions when the air conditioner comprises the display screen;
determine that the air conditioner does not comprise a display screen allowing the air conditioner to operate normally, in a case when the air conditioner does not comprise the display screen, or in a case when the display screen of the air conditioner malfunctions;
wherein the processor is further configured to be capable of executing the stored program instructions to:
detect whether the air conditioner is connected to an external device, wherein the external device is configured to control the air conditioner;
control the air conditioner to enter the terminal control mode when the air conditioner is connected to the external device, wherein the terminal control mode is configured to control the air conditioner through the external device communicating with the air conditioner;
control the air conditioner to maintain the current operating state when the air conditioner is not connected to the external device.

7. The control device according to claim 6, wherein, the display screen of the air conditioner is a touch screen, and comprises a display screen disposed on the air conditioner panel or a display screen disposed at a predetermined indoor position separately from the air conditioner.

* * * * *